United States Patent [19]

Gleixner et al.

[11] Patent Number: 5,241,267
[45] Date of Patent: Aug. 31, 1993

[54] ROTATION DETECTOR USING DIFFERENTIAL HALL SENSOR CIRCUITRY

[75] Inventors: Ronald Gleixner, Ochsenfurt; Ulrich Lachmann, München; both of Fed. Rep. of Germany

[73] Assignee: Siemens Aktiengesellschaft, Munich, Fed. Rep. of Germany

[21] Appl. No.: 565,949

[22] Filed: Aug. 10, 1990

[30] Foreign Application Priority Data

Aug. 11, 1989 [EP] European Pat. Off. ............ 89114923

[51] Int. Cl.[5] ..................... G01B 7/30; G01R 33/06; G01P 3/487; G01P 3/489
[52] U.S. Cl. ............................ 324/207.2; 324/207.25; 324/174
[58] Field of Search ................. 324/207.20, 207.21, 324/207.25, 251, 235, 252, 161, 173, 174

[56] References Cited

U.S. PATENT DOCUMENTS

| | | | |
|---|---|---|---|
| 4,093,917 | 6/1978 | Haeussermann | 324/207.2 X |
| 4,232,451 | 11/1980 | Thomsen | 33/361 |
| 4,283,679 | 8/1981 | Ito et al. | 324/207.25 X |
| 4,349,814 | 9/1982 | Akehurst | 324/251 X |
| 4,361,835 | 11/1982 | Nagy | 324/207.2 X |
| 4,533,902 | 8/1985 | Baker et al. | 324/207.25 X |
| 4,733,177 | 3/1988 | Pawletko | 324/251 X |
| 4,737,710 | 4/1988 | Van Antwerp et al. | 324/207.2 |
| 4,739,264 | 4/1988 | Kamiya et al. | 324/251 |
| 4,847,555 | 7/1989 | Stammer et al. | 324/161 |

FOREIGN PATENT DOCUMENTS

| | | |
|---|---|---|
| 2946013 | 5/1981 | Fed. Rep. of Germany . |
| 2341838 | 9/1977 | France . |
| 2197483 | 5/1988 | United Kingdom . |

OTHER PUBLICATIONS

Siemens Publication: "Differential Hall ICs for Gear Tooth Sensing in Hostile Environments", Sensors, Jan. 1989.
Patent Abstracts of Japan, vol. 9, No. 280 8 Nov. 1985, & JP-A-60 121978 (Sony K.K.) 29 Jun. 1985.

Primary Examiner—Gerard R. Strecker
Assistant Examiner—Warren S. Edmonds
Attorney, Agent, or Firm—Kenyon & Kenyon

[57] ABSTRACT

A rotation detector for a magnet wheel which is high-resolution, precise and at the same time only requires the space of a single differential Hall IC, has combined on a single electronic component the circuitry equivalent to at least two differential Hall IC's. The electronic component derives a digital signal sequence that has a frequency twice the frequency of a signal that can be derived from a single differential Hall circuit by coupling the output signals of the differential Hall circuits. Additionally, only three Hall sensors are required to form the difference signals necessary to derive the digital signal sequence by using one Hall sensor as a reference for the remaining two Hall sensors.

3 Claims, 2 Drawing Sheets

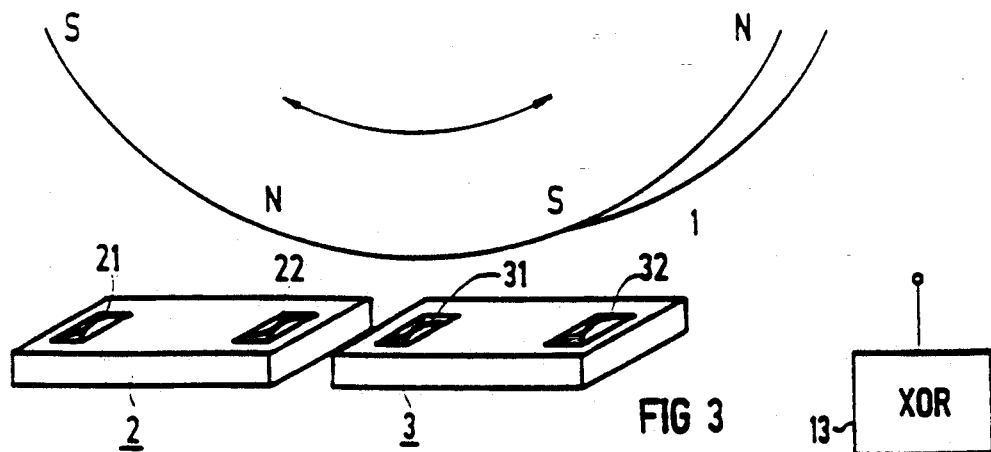
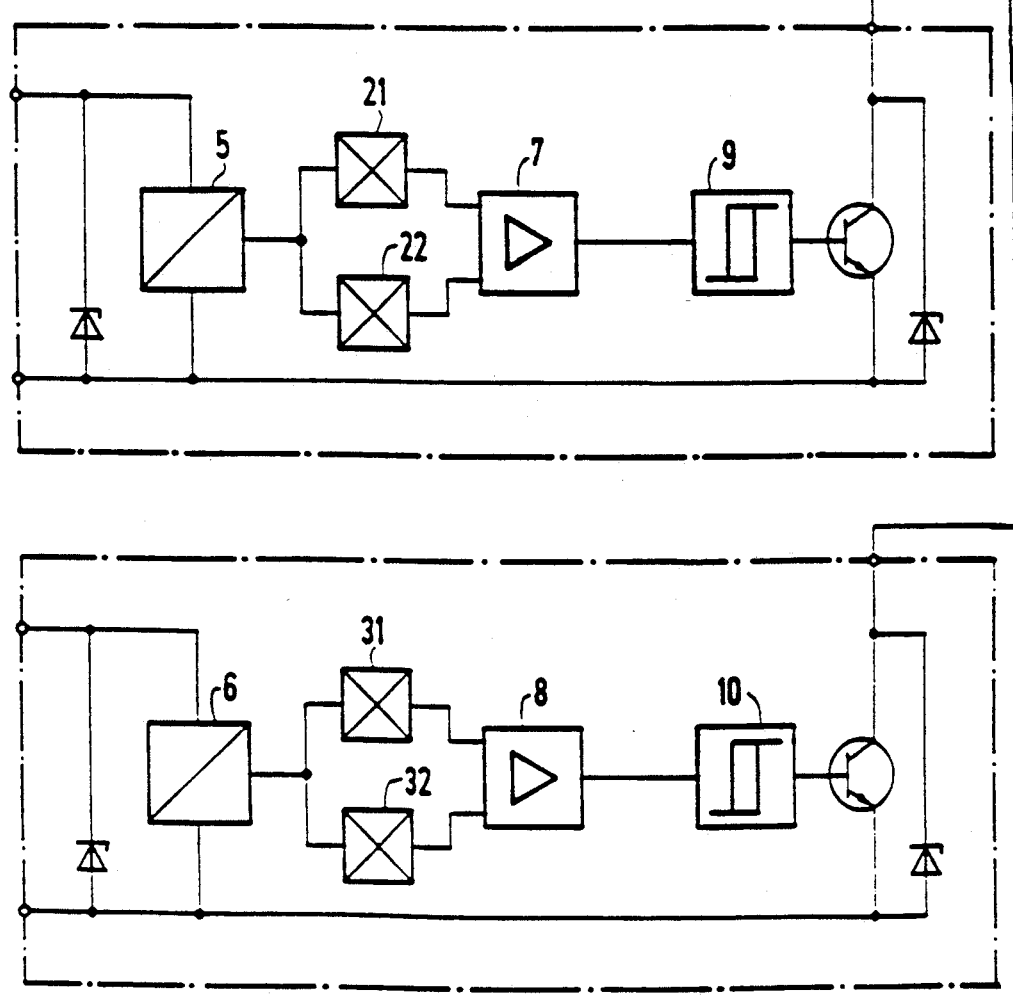
FIG 3
FIG 4

ROTATION DETECTOR USING DIFFERENTIAL HALL SENSOR CIRCUITRY

BACKGROUND OF THE INVENTION

This invention relates to rotation detectors in general, and more particularly to an improved rotation detector having an electronic component containing a plurality of Hall sensors.

A rotation detector having an electronic component, associated with a magnet wheel that has an alternating North/South pole sequence, and in which the electronic component is in the form of a differential Hall IC that derives a digital signal sequence from a difference of the output signals of two Hall sensors that are displaced in phase, one behind the other, opposite the pole sequence is disclosed in the Siemens publication "Differential Hall IC's for Gear Tooth Sensing in Hostile Environments" from SENSORS, January 1989. For the purpose of accurate speed detection, in order to attain clearly defined slopes in the speed detecting digital output signal sequence even in the case of only slight changes in magnetic force which are rendered by a magnet wheel, the above publication teaches arranging two Hall sensors displaced in phase, one behind the other, on a single component for the purpose of spacing the phases of the magnet wheel; subtracting the output signals of the Hall sensors in an amplifier; and, after optionally passing through a high pass filter, converting the output signals by means of a digital signal transmitter—preferably such as a Schmitt-trigger—into a digital signal sequence which is proportional to speed or into a rotation-indicating digital signal. Although this arrangement works well, there is a requirement for increased resolution, without simultaneously increasing cost or volume requirements appreciably.

SUMMARY OF THE INVENTION

The present invention meets this requirement for the above mentioned type of rotation detector by combining the circuitry equivalent to at least two differential Hall IC's on a single electronic component and deriving a digital signal sequence that has a frequency twice the frequency of a signal that can be derived from a single differential Hall circuit by coupling the outputs of the two differential Hall circuits. The coupling of the outputs of the differential Hall circuits to obtain the desired resolution can be accomplished using an exclusive OR gate. This increased resolution, according to the present invention, is attainable in an advantageous manner with little installation space, low assembly costs and high mechanical precision.

The installation space required for this type of component and the requisite expenditure of electronic components in order to attain the increased resolution can be further reduced by mounting only three Hall sensors on a single electronic component such that respective difference signals are formed between a reference Hall sensor and each of the two remaining Hall sensors.

The cost of the electronic evaluating circuit that is integrated on the component, with a differential amplifier following the Hall sensors and with at least one digital signal transmitter, e.g. a Schmitt trigger, can be further reduced by coupling the output of the reference Hall sensor to the input of a first differential amplifier as well as to a second differential amplifier each followed by a digital signal transmitter; by coupling one of the remaining Hall sensors only to the input of one differential amplifier and by coupling the last Hall sensor only to the input of the other differential amplifier; and by providing only a single common current supply for all the Hall sensors.

BRIEF DESCRIPTION OF THE DRAWINGS

FIG. 3 is a diagram similar to FIG. 1 illustrating two discrete electronic components, each in the form of a differential Hall IC, which are arranged one behind the other displaced in phase, opposite the pole sequence of the magnet wheel.

FIGS. 4 depicts schematic diagrams of the evaluating circuits that are integrated in the differential Hall IC's according to FIG. 3.

DETAILED DESCRIPTION

Figure 1:
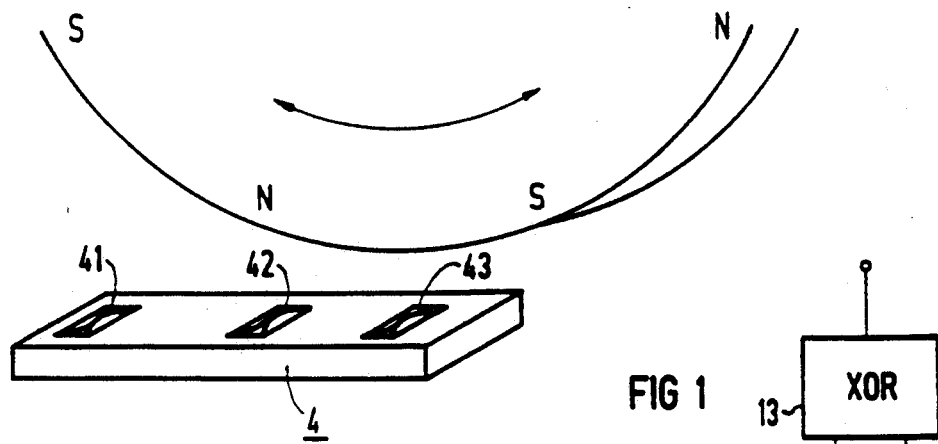
FIG. 1 is a perspective sectional view showing a single electronic component according to the invention having three Hall sensors arranged one behind the other opposite a magnet wheel in order to space the phases of the magnet wheel.

FIG. 3 shows a magnet wheel 1 with an alternating North/South magnetic pole sequence distributed over its circumference. Close to the magnet wheel 1 are two discrete electronic components 2 and 3 each in the form of a separate differential Hall IC. Each differential Hall IC has two Hall sensors 21 and 22, and 31 and 32 respectively, arranged one behind the other in the direction of the pole sequence, close to the magnet wheel 1. One electronic supply circuit and evaluating circuit is integrated in each electronic component 2 and 3 according to FIG. 4.

The Hall sensors 21 and 22 of the electronic component 2 are fed by a voltage supply 5 and sense the passing poles of the rotating magnet wheel 1. The output signals of the Hall sensors 21 and 22 are subtracted from each other in the amplifier 7 and are transformed into a digital signal sequence with the aid of the digital signal transmitter 9, which is designed in the form of a Schmitt trigger. In a similar manner, a signal sequence is developed by means of the Hall sensors 31 and 32 of the electronic component 3. The Hall sensors 31 and 32 are fed by a voltage supply 6 and form a difference signal in an amplifier 8. The difference signal is transformed into a digital signal sequence in a digital signal transmitter 10. Through the corresponding arrangement of the two electronic components 2 and 3 and their Hall sensors 21 and 22, and 31 and 32 respectively, the signal sequences are displaced in phase with respect to each other relative to the pole sequence of the magnet wheel 1. By using an exclusive OR gate 13 following the two evaluating circuits shown in FIG. 4, both digital signal sequences of the electronic components 2 and 3, can be processed into a sum signal that has a frequency twice the frequency of the individual signal sequences. Thus, an increased resolution can be obtained for speed measurement or for detecting the rotational direction by comparing the phases of both signal sequences.

Figure 2:
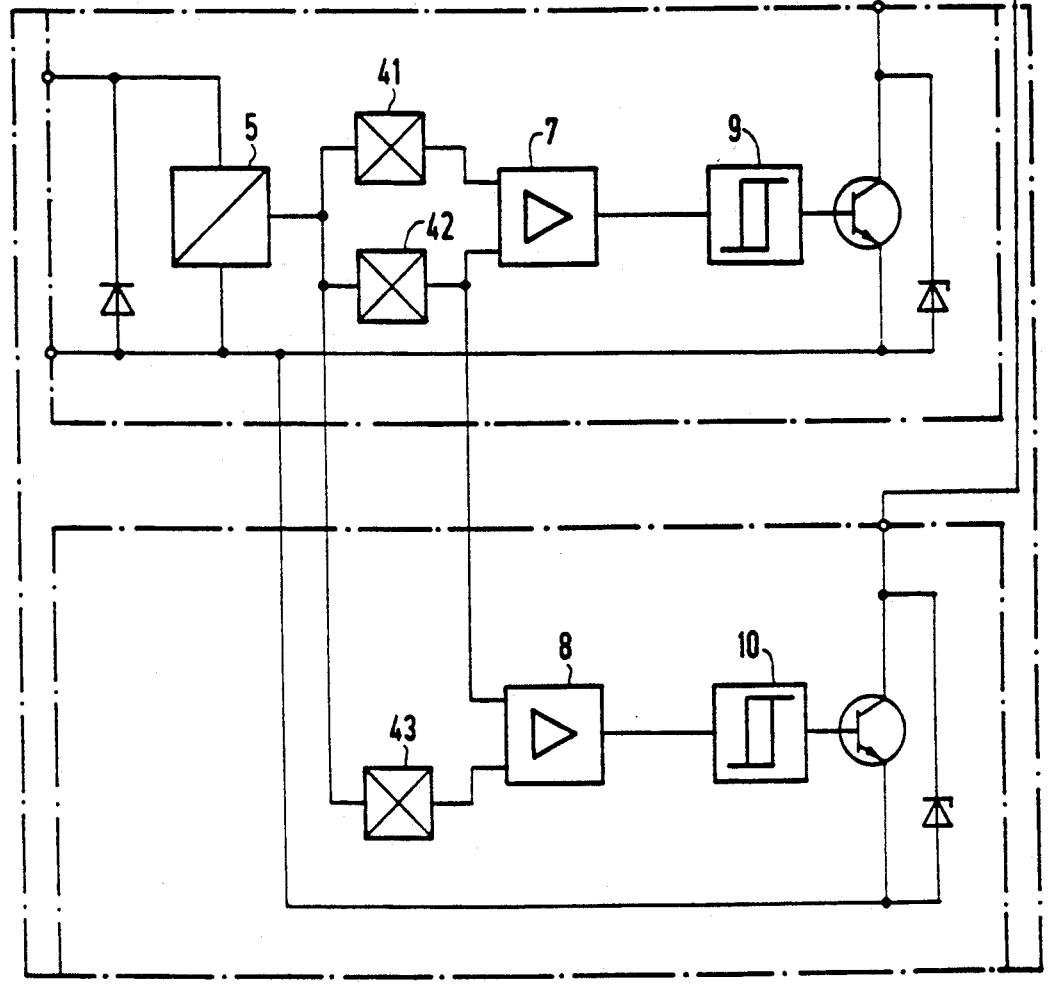
FIG. 2 schematic diagram of the evaluating circuit for the output signals of the three Hall sensors that is integrated within the electronic component of FIG. 1.

However, simply combining two Hall IC's as shown in FIGS. 3-4, presents problems of space, alignment, etc. Thus, in accordance with the present invention, as shown in FIGS. 1 and 2, both electronic components 2 and 3 are combined into one single IC-component so that inaccuracies are reliably avoided while scanning to detect rotation. These inaccuracies are those caused by the mechanical configuration and sensor placement or by the tolerances of the individual components, as can arise in a configuration as shown in FIG. 3. As in the embodiment of FIG. 4 the electronic components 2 and 3, despite being formed on the chip, can supply their outputs to the input terminals of exclusive OR Gate 13.

In addition to the advantages of a mechanically conditioned component, and increased accuracy, the cost of the electronic components can be further reduced as in the embodiment of FIG. 1, where just three Hall sensors 41, 42 and 43 are integrated into one single electronic component 4. These three Hall sensors 41, 42 and 43 have digital signal sequences that can be evaluated like those of two separate differential Hall IC's according to FIG. 3 by using one Hall sensor 42 as a reference Hall sensor to form a difference with each of the remaining Hall sensors 41 and 43.

The cost of electronic circuitry for the three Hall sensors 41, 42 and 43 which are integrated in the single electronic component 4 can be still further reduced by providing a single common voltage supply 5 for all Hall sensors 41, 42 and 43 as depicted in FIG. 2. Additionally, the output of the reference Hall sensor 42 is connected both to the input of a first differential amplifier 7 as well as to the input of a second differential amplifier 8 each followed by a digital signal transmitter. The remaining Hall sensors 41 and 43 are connected only to the input of only one of the differential amplifiers 7 and 8.

The application of the rotation detector according to the invention is particularly suitable for actuating drives with a low number of polar sequences and/or a low speed but which require a higher resolution with clearly defined slopes in the output signal to be evaluated. Thus, according to an advantageous application of the invention, the magnet wheel 1 is provided as the rotor of a servo-motor in an electronically automated coupling in a motor vehicle, as is described e.g. on page 13 in the Sachs Journal of the corporation Fichtel & Sachs AG, 8720 Schweinfurt, Issue December 1988.

The invention has been described in light of rotation detection for a magnet wheel having two differential Hall circuits which are integrated in one single component. Within the scope of the invention, however, the underlying principle with the advantages of mechanical precision and a reduction in electronic components can be extended to linear pole sequences and/or to an integration of more than two discrete differential Hall circuits on a single electronic IC component.

What is claimed is:

1. A rotation detector for a magnet wheel with a pole sequence of alternating North and South poles comprising a single electronic component including:
   a) a first Hall sensor sensing the pole sequence having an alternating output;
   b) a second Hall sensor sensing the pole sequence having an alternating output;
   c) a third Hall sensor sensing the pole sequence having an alternating output;
   d) means for forming first and second output signals as a difference between the outputs of said first and second Hall sensors and as a difference between the outputs of said second and third Hall sensors, respectively, the first and second output signals each having a first frequency, said means for forming having the outputs of said first, second and third Hall sensors as inputs, said single electronic components also including means for forming a digital signal sequence having a second frequency twice the first frequency by coupling the first and second output signals; and
   e) a single common voltage supply coupled to said first, second and third Hall sensors.

2. The rotation detector according to claim 1, wherein the means for forming said digital signal sequence further comprises the first output signal as a first input, the second output signal as a second input, and the digital signal sequence as an output.

3. The rotation detector according to claim 2, wherein said means for forming said digital signal sequence comprises an exclusive OR gate.

* * * * *